(12) United States Patent
Wade

(10) Patent No.: US 9,051,049 B2
(45) Date of Patent: Jun. 9, 2015

(54) ORNITHOPTER AIRCRAFT TRANSMISSION

(76) Inventor: Darvin P. Wade, Pahrump, NV (US)

( * ) Notice: Subject to any disclaimer, the term of this patent is extended or adjusted under 35 U.S.C. 154(b) by 770 days.

(21) Appl. No.: 13/385,019

(22) Filed: Jan. 30, 2012

(65) Prior Publication Data
US 2013/0195659 A1   Aug. 1, 2013

(51) Int. Cl.
B64C 33/02       (2006.01)
F16H 23/02       (2006.01)
F16H 23/10       (2006.01)

(52) U.S. Cl.
CPC .............. B64C 33/02 (2013.01); *Y10T 74/1692* (2015.01); *Y10T 74/18336* (2015.01); F16H 23/02 (2013.01); *F16H 23/10* (2013.01)

(58) Field of Classification Search
CPC ............................. B64C 33/02; F16H 23/02
USPC ........................................................ 244/22
See application file for complete search history.

(56) References Cited

U.S. PATENT DOCUMENTS

| | | | |
|---|---|---|---|
| 1,064,872 A * | 6/1913 | Thomaas ........................ 244/22 |
| 1,151,862 A * | 8/1915 | Buraczewski ................. 244/22 |
| 1,308,784 A * | 7/1919 | Hoiland ........................ 244/22 |
| 3,942,384 A | 3/1976 | Parker | |
| 5,417,621 A | 5/1995 | Tibbles | |
| 5,514,047 A | 5/1996 | Tibbles et al. | |
| 5,681,235 A | 10/1997 | Ketcham | |
| 5,743,716 A | 4/1998 | Smith | |
| 6,640,687 B1 | 11/2003 | Frantz et al. | |

* cited by examiner

*Primary Examiner* — Richard Edgar
(74) *Attorney, Agent, or Firm* — Caesar Rivise, PC

(57) ABSTRACT

This invention is regarding an aircraft transmission that is designed to enable an ornithopter aircraft to take off vertically by generating lift through precision controlled oscillating propellers or wings, similar but unlike a helicopter rotor blade and has the uncanny ability for aerobatic flight. A gearless infinite variable oscillating transmission for ornithopter aircraft oscillatory motion propulsion, wherein the oscillatory motion is generated by a wobble plate and propulsive motion is propellers, wings, or any other propulsive action or phenomena, characterized by two parts, or pairs of elements, of the same potential capacity, which oscillate in series on opposed fronts with each propulsion unit capable of operating independently of the other. Infinite variable oscillating transmission is used to power numerous mechanical devices.

10 Claims, 2 Drawing Sheets

ORNITHOPTER AIRCRAFT TRANSMISSION

TECHNICAL FIELD

According to the invention, there is provided an oscillating motion transmission mechanism for driving propellers, wings or any other devices with variable control of pitch and angle of attack, with 360 degree adjustable control of radial rotation of the propeller cord line and infinite variable stroke space between propellers or wings propulsion. Oscillating mechanism could be used in the aircraft industries, mechanical tools or numerous other power devices which addresses the deficiencies of prior art.

BACKGROUND ART

No known existing prior art exists for an aircraft transmission capable of producing independent propeller or wing propulsion on three separate axis for aircraft use.

Infinitely variable torque ratio characteristics for a power transmission can be achieved by using a friction belt and pulley arrangement in which a drive pulley and a driven pulley, connected by an endless belt, are adapted for torque transfer with an infinitely variable torque ratio range by adjusting the pitch diameter of the pulleys, the pitch diameter of the driving pulley increasing as the pitch diameter of the driven pulley decreases, and vice versa. Examples of belt drives of this kind may be seen by referring to U.S. Pat. Nos. 5,417,621 and 5,514,047.

It is known design practice also to provide infinitely variable torque ratio characteristics by using a hydraulic pump as a driving member and a hydraulic motor as a driven member. The pump and motor are located in a closed hydrostatic fluid pressure circuit. By varying the displacement of the pump, the effective speed ratio of the hydrostatic transmission can be changed through a wide torque ratio range. Examples of WOBBLE-plate drives of this kind may be seen by referring to U.S. Pat. Nos. 6,640,687 and 5,743,716.

Various types of infinitely variable friction drives also are well known. It is known design practice, for example, to use friction cone members wherein the relative positions of the friction cones are adjustable to provide an infinitely variable torque ratio characteristic. An example of a friction cone drive mechanism may be seen by referring to U.S. Pat. No. 5,681,235.

Various Wobble-Plate configurations used for pumps as in this patent. Referring to FIG. 1 of the drawings, a WOBBLE plate machine for use as a pump will be described. U.S. Pat. No. 3,942,384

SUMMARY OF THE INVENTION

It is the primary object of the present invention to provide a new and improved mechanical system for varying the pitch angle of the blades of a propeller or wings during oscillation thereof.

It is the primary object of the present invention to provide a new and improved transmission system for oscillating propellers, wings or other propulsion mechanism.

It is the primary object of the present invention to provide a new and improved system for changing the cord line of propeller, wings or other propulsion mechanism.

In view of the above problems, it is an object of the present invention to provide an improved method for creating oscillating motion on two distinct axis planes of a wobble plate and to provide the means for creating a new and improved ornithopter aircraft transmission.

The present invention relates to an all bearing, gearless oscillating transmission mechanism having infinitely variable oscillation ratios on two axis plane and a means for adjustable rotation of complete transmission on a third axis plane. In particular, the present invention relates to an oscillation mechanism whose oscillation ratios change continuously over the oscillation ratio continuum with means for variable control of space between stroke length of oscillations and means for changing the angle of attack of oscillating propellers, wings, or any other propulsive action or phenomena and when the transmission as a unit is rotated around the circumference of an input rotary torque power input shaft having the means for infinite 360 degrees control of the propeller cord line. This Invention solves the problem for using a non-complex all ball bearing light weight oscillating transmission mechanism for aircraft, ornithopter or tool use. Object of the invention is for aircraft use.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF THE INVENTION

Figure 1:
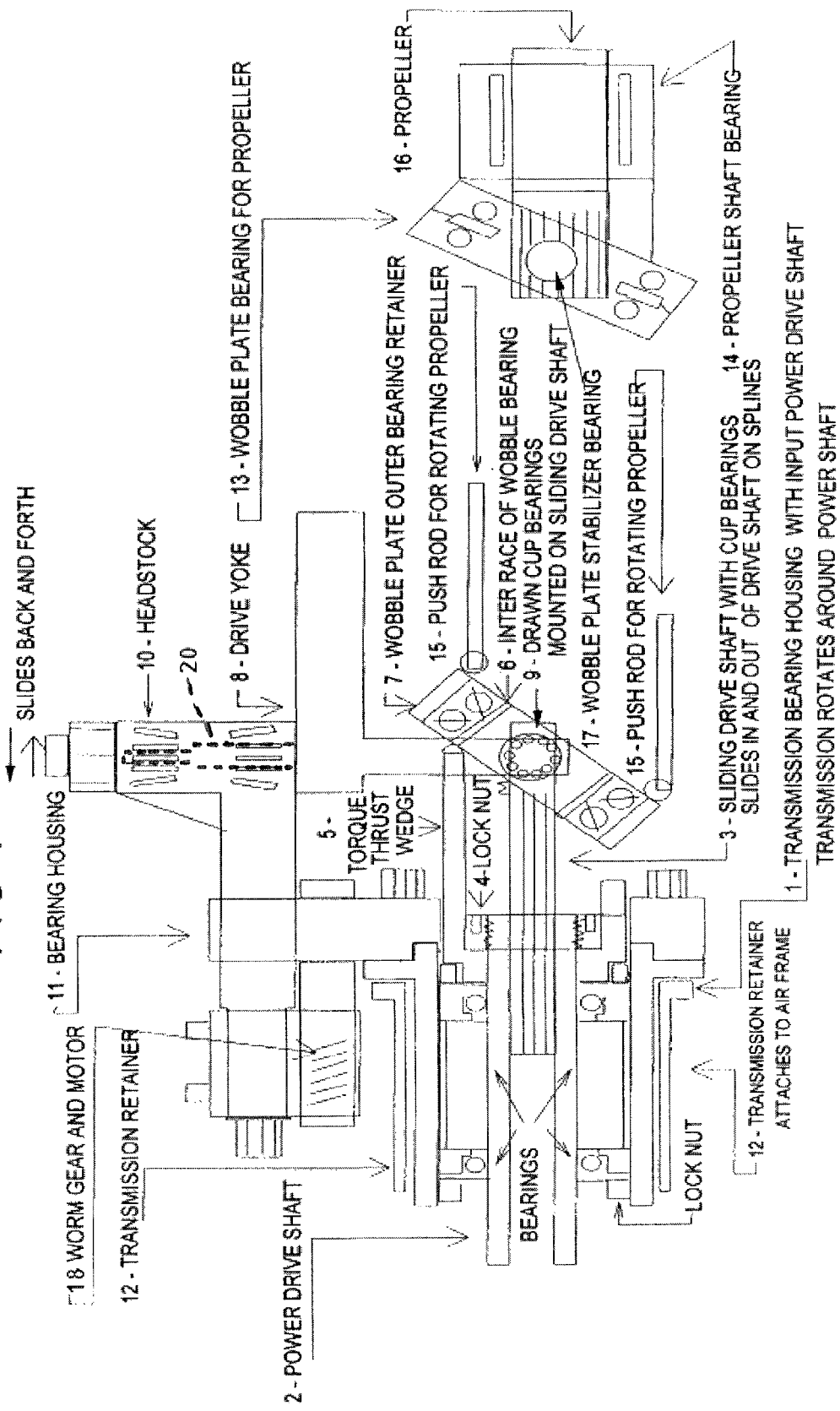
FIG. 1 is a complete drawing of the mechanism.

Referring to FIG. 1 of the drawings;

A wobble plate oscillating mechanism for use as an ornithopter propulsion device for driving propellers or wings, with variable control of the pitch or angle of attack of oscillating propeller or wings propulsion motion, with means for 360 degrees of adjustable control of propeller cord line, and means for variable control of space between oscillation stroke lengths of propellers or wings. In this embodiment a rotatable bearing housing 1 is fitted inside with a rotary torque power input shaft 2. Rotary torque power input shaft 2 which has inside splines at the torque end of shaft 2 for driving a linear sliding drive shaft 3 with outside splines. One end of linear sliding drive shaft 3 with outside splines mounts inside said rotary torque power input shaft 2 with means for linear sliding movement and rotary torque drive motion. Drive end of sliding drive shaft 3 has means for mounting two drawn cup needle bearings 9 that are located at 180 degrees straight line from each other. Sliding drive shaft 3 is mounted into interrace 6 with two bearings and is used for radial rotation of wobble plate bearing 7 and for creating oscillating motion on two axis planes. Wobble plate 7 is rotatable adjustable on drawn cup needle bearings 9 of sliding drive shaft 3. Using a torque wedge 5 mounted on the end of the rotary torque power input shaft 2 and connected to inter bearing race 6 of wobble plate 7, infinitely changing angle of momentum of wobble plate from "principal axis of rotation". Outer race housing of wobble plate bearing 7 is mounted to drive yoke 8 which has two bearings mounted to the outside race of wobble plate bearing housing 7 at 180 degrees straight line. Yoke 8 is mounted in a headstock 10 fitted with bearings and will follow wobble plate outer bearing retainer 7 on one oscillating axis plane established by vertical axle 20. Wobble plate 7 mounted in yoke 8 has two distinct axis of oscillation movement perpendicular to each axis. Radial rotation of complete transmission unit about the circumference of the rotary power shaft will change cord angle of attack of propeller 16 and lateral movement of headstock 10 and yoke 8 will change stroke length of propeller or wings. Yoke 8 mounts inside headstock 10 at a 90 degree angle to the attached outer bearing race of wobble plate 7. A sliding shaft is formed to headstock 10 at 90 degrees and slides into a bearing housing 11. Head stock 10 has means for linear sliding of headstock shaft 10 back and forth in a longitudinal direction using a worm gear 18. Moving headstock shaft 10 in a linear direction will move yoke 8 and said wobble plate bearing 7 as a unit in a linear direction which will adjust inter-race 6, of wobble plate bearing 7, from principal plane of rotation and imparts a gyroscopic wobble motion to wobble plate bearing 7. Drive yoke 8 will follow the movement of wobble plate outer bearing retainer 7 on one fixed axis plane creating an oscillating motion on two axis planes.

Figure 2:
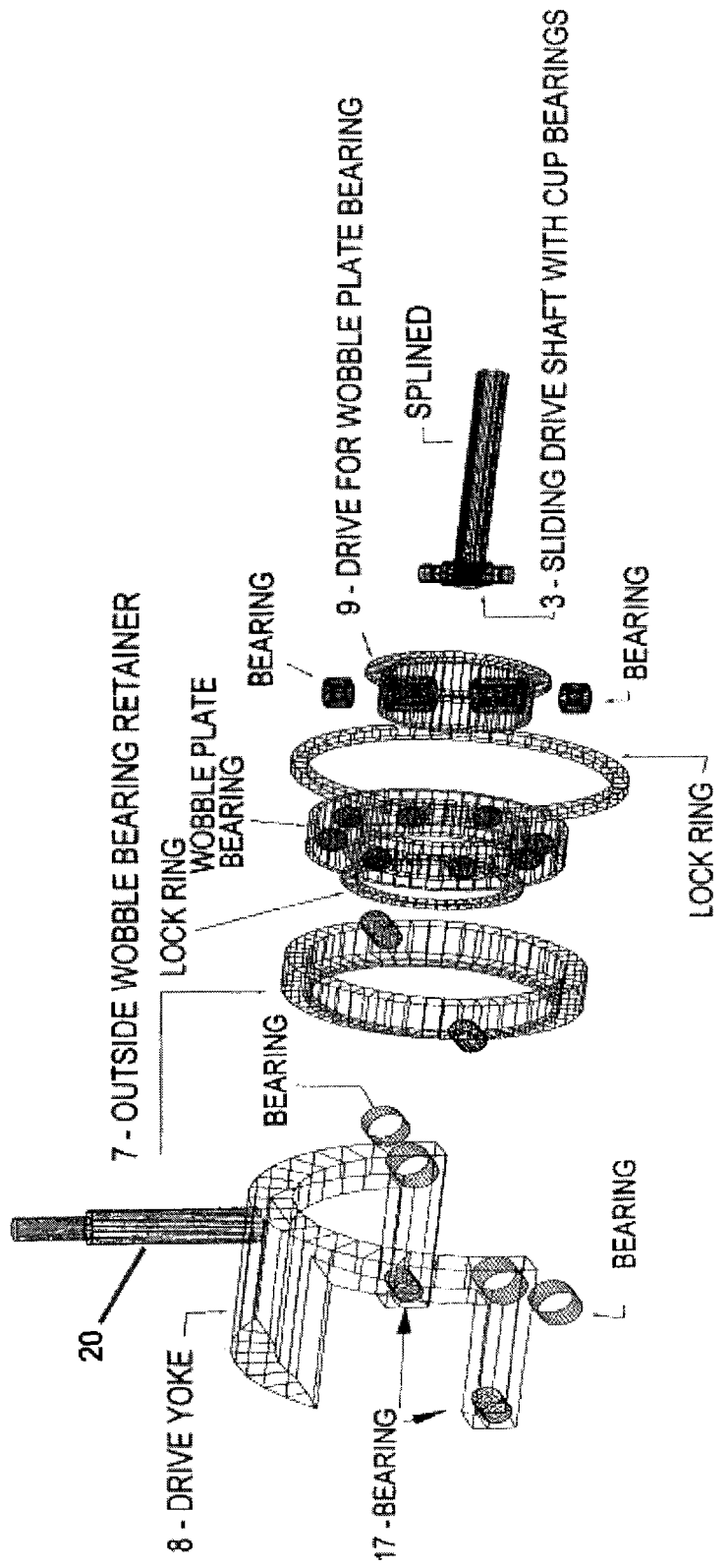
FIG. 2 is a diagrammatic cross section of drive yoke and headstock.

Referring to FIG. 2 of the drawings;

A means for mounting sliding drive shaft 3 into inter-race 6 and wobble plate bearing 7 into yoke 8, and headstock 10. While the invention has been described in its preferred form, it is to be understood that the invention is not limited to the precise form of the illustrated embodiment, but various changes and modifications may occur to those skilled in the art, within the scope of the invention defined in the appended claims.

For example, the dimensions and configuration of the wobble plate bearing and inter-race may be modified and reverse engineered within the principle of the invention which will be apparent from the foregoing description.

Further, the wobble plate bearing in the preceding embodiment may be reverse engineered by a rotary torque power input shaft with bearings connected to the outside of the wobble plate bearing retainer. Inside race of wobble plate will be connected to a drive shaft with two bearings that do not radially rotate. The two bearings will allow the wobble plate bearing to rotate from its principal axis of radial rotation centerline. Drive shaft connects to a propeller that is attached to a yoke that mounts inside a headstock. Using a wedge between the outside race of wobble and power input shaft for rotating wobble plate from its principal plane of rotation. The effect will be the same.

The invention claimed is:

1. An oscillating transmission mechanism, comprising:
 a yoke pivotally mounted within a fixed headstock such that said yoke pivots about a first axis;
 a wobble plate assembly pivotally mounted within said yoke such that said wobble plate assembly pivots about a second axis that is orthogonal to said first axis, said wobble plate assembly comprising:
  an annular retainer that is pivotally mounted within said yoke;
  an annular bearing that is rotatable within said annular retainer, said annular bearing having an inter bearing race; and
  a drive that is secured within said annular bearing;
 a shaft having a longitudinal axis that is orthogonal to both said first and second axes and having a first end that is secured to said drive and having a second end that is driven to rotate about its longitudinal axis, said second end further comprising a wedge that is parallel to said shaft and comprises a wedge end that makes contact with said inter bearing race; and
 said wobble plate assembly and yoke being subjected to an oscillating motion as said second end is driven to rotate, causing said annular bearing to rotate within said annular retainer while said wedge causes an angle of momentum of said annular bearing to continuously change.

2. The oscillating transmission mechanism of claim 1 wherein said headstock is fixedly mounted to a support surface and wherein said shaft is displaceable along said longitudinal axis to cause said oscillating motion to be variable.

3. The oscillating transmission mechanism of claim 1 wherein said headstock is adjustable to be displaced along said longitudinal axis to cause said oscillating motion to be variable.

4. The oscillating transmission mechanism of claim 1 wherein said first axis is a vertical axis and said second axis is a horizontal axis.

5. The oscillating transmission mechanism of claim 4 wherein said longitudinal axis is also a horizontal axis.

6. , A method for generating an oscillating motion without using gears, said method comprising:
 a) pivotally mounting a yoke within a headstock along a first axis;
 b) pivotally mounting a wobble plate assembly within said yoke such that said wobble plate assembly pivots about a second axis orthogonal to said first axis and wherein said wobble plate assembly comprises an annular retainer that is mounted within said yoke, an annular bearing that is rotatable within said annular retainer and a drive that is secured within said annular bearing, said annular bearing including an inter bearing race;
 c) coupling a shaft, having a longitudinal axis that is orthogonal to both said first and second axes, to said drive at a first end while a second end of said shaft is coupled to a rotating mechanism;
 d) positioning a wedge that is parallel to said shaft at said first end and wherein said wedge comprises a wedge end that is contact with said inter bearing race; and
 e) rotating said shaft about its longitudinal axis to subject said yoke and wobble plate assembly to an oscillating motion as said wedge end rides along said inter bearing race as said annular bearing rotates within said annular retainer, while said yoke pivots about said first axis and said wobble plate assembly pivots about said second axis.

7. The method of claim 6 further comprising the steps of fixing said headstock to a support surface; and
 displacing said shaft along said longitudinal axis to cause said oscillating motion to be variable.

8. The method of claim 6 further comprising the step of displacing said headstock along said longitudinal axis to cause said oscillating motion to be variable.

9. The method of claim 6 wherein said first axis is a vertical axis and said second axis is a horizontal axis.

10. The method of claim 9 wherein said longitudinal axis is also a horizontal axis.

* * * * *